United States Patent
Lemmey

(10) Patent No.: US 8,990,709 B2
(45) Date of Patent: Mar. 24, 2015

(54) METHOD AND SYSTEM FOR REPRESENTING AUDIENCES IN ENSEMBLE EXPERIENCES

(75) Inventor: Tara Lemmey, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 153 days.

(21) Appl. No.: 13/540,441

(22) Filed: Jul. 2, 2012

(65) Prior Publication Data

US 2013/0014027 A1    Jan. 10, 2013

Related U.S. Application Data

(60) Provisional application No. 61/505,948, filed on Jul. 8, 2011, provisional application No. 61/536,481, filed on Sep. 19, 2011.

(51) Int. Cl.
| | |
|---|---|
| *G06F 3/0481* | (2013.01) |
| *H04N 21/4788* | (2011.01) |
| *H04N 21/431* | (2011.01) |
| *G06F 3/01* | (2006.01) |
| *A63F 13/00* | (2014.01) |

(52) U.S. Cl.
CPC . *G06F 3/01* (2013.01); *A63F 13/00* (2013.01); *G06F 3/0481* (2013.01); *H04N 21/4788* (2013.01); *H04N 21/4312* (2013.01)
USPC ......................................................... 715/753

(58) Field of Classification Search
CPC .............. G06F 3/0481; G06F 3/04815; H04N 21/4788; A63F 13/12; A63F 2300/5573
USPC ................................................ 715/753, 757
See application file for complete search history.

(56) References Cited

U.S. PATENT DOCUMENTS

| | | | |
|---|---|---|---|
| 8,428,561 B1 * | 4/2013 | Vance et al. ............... | 455/412.2 |
| 8,522,160 B2 * | 8/2013 | Imanishi ....................... | 715/810 |
| 2002/0073417 A1 * | 6/2002 | Kondo et al. .................. | 725/10 |
| 2003/0018427 A1 * | 1/2003 | Yokota et al. ................. | 701/208 |
| 2003/0156124 A1 * | 8/2003 | Good et al. .................... | 345/620 |
| 2003/0193481 A1 * | 10/2003 | Sokolsky ...................... | 345/173 |
| 2003/0200259 A1 * | 10/2003 | Tsuge .......................... | 709/203 |
| 2004/0014478 A1 * | 1/2004 | Hoffman et al. ........... | 455/456.1 |
| 2004/0140995 A1 * | 7/2004 | Goldthwaite et al. ........ | 345/716 |
| 2005/0039123 A1 * | 2/2005 | Kuchinsky et al. ........... | 715/526 |
| 2005/0086004 A1 * | 4/2005 | Smith ............................. | 702/3 |
| 2005/0197846 A1 * | 9/2005 | Pezaris et al. ..................... | 705/1 |
| 2006/0048064 A1 * | 3/2006 | Vronay ........................ | 715/764 |
| 2006/0223518 A1 * | 10/2006 | Haney ........................... | 455/420 |
| 2006/0242607 A1 * | 10/2006 | Hudson ......................... | 715/863 |
| 2007/0055782 A1 * | 3/2007 | Wright et al. ................. | 709/227 |
| 2007/0117576 A1 * | 5/2007 | Huston ......................... | 455/461 |
| 2007/0218900 A1 * | 9/2007 | Abhyanker ................ | 455/435.1 |

(Continued)

*Primary Examiner* — Andrea Long
(74) *Attorney, Agent, or Firm* — Perkins Coie LLP

(57) ABSTRACT

The present invention contemplates a variety of methods and techniques for representing an audience during an ensemble experience. According to one aspect, an ensemble or group experience is provided to a plurality of users. The experience includes displaying content and other information (perhaps in layers) to a specific local user. The specific user is provided an audience representation layer or "swell" interface appearing translucently over the base layer. The audience representation layer includes a plurality of marks providing certain information related to the audience. Each mark is related to an entity such as an audience member, a group, a sponsor, or a celebrity. The local user mark is distinguishable from the other plurality of marks.

35 Claims, 23 Drawing Sheets

(56) References Cited

U.S. PATENT DOCUMENTS

| | | | |
|---|---|---|---|
| 2007/0220174 A1* | 9/2007 | Abhyanker | 709/250 |
| 2008/0016018 A1* | 1/2008 | Malik | 706/46 |
| 2008/0070593 A1* | 3/2008 | Altman et al. | 455/457 |
| 2008/0119201 A1* | 5/2008 | Kolber et al. | 455/456.1 |
| 2008/0186164 A1* | 8/2008 | Emigh et al. | 340/539.13 |
| 2008/0231643 A1* | 9/2008 | Fletcher et al. | 345/661 |
| 2008/0301565 A1* | 12/2008 | Abhyanker | 715/744 |
| 2008/0319778 A1* | 12/2008 | Abhyanker | 705/1 |
| 2009/0013263 A1* | 1/2009 | Fortnow et al. | 715/753 |
| 2010/0037152 A1* | 2/2010 | Bates et al. | 715/757 |
| 2010/0081457 A1* | 4/2010 | Jerome et al. | 455/456.3 |
| 2010/0123737 A1* | 5/2010 | Williamson et al. | 345/672 |
| 2010/0197318 A1* | 8/2010 | Petersen et al. | 455/456.1 |
| 2010/0246789 A1* | 9/2010 | Vance et al. | 379/201.01 |
| 2011/0029420 A1* | 2/2011 | Bianco et al. | 705/32 |
| 2011/0029894 A1* | 2/2011 | Eckstein | 715/753 |
| 2011/0137813 A1* | 6/2011 | Stewart | 705/319 |
| 2011/0148935 A1* | 6/2011 | Arrasvuori | 345/676 |
| 2011/0167058 A1* | 7/2011 | van Os | 707/722 |
| 2011/0225515 A1* | 9/2011 | Goldman et al. | 715/757 |
| 2011/0246908 A1* | 10/2011 | Akram et al. | 715/752 |
| 2011/0271208 A1* | 11/2011 | Jones et al. | 715/753 |
| 2011/0304584 A1* | 12/2011 | Hwang | 345/174 |
| 2011/0312344 A1* | 12/2011 | McCahill et al. | 455/456.1 |
| 2012/0084169 A1* | 4/2012 | Adair et al. | 705/26.3 |
| 2012/0158501 A1* | 6/2012 | Zhang et al. | 705/14.53 |
| 2012/0197989 A1* | 8/2012 | Lueth et al. | 709/204 |
| 2012/0208564 A1* | 8/2012 | Clark et al. | 455/456.3 |
| 2012/0271883 A1* | 10/2012 | Montoya et al. | 709/204 |
| 2012/0323488 A1* | 12/2012 | Callaghan | 701/454 |
| 2013/0282282 A1* | 10/2013 | Jiang et al. | 701/533 |

* cited by examiner

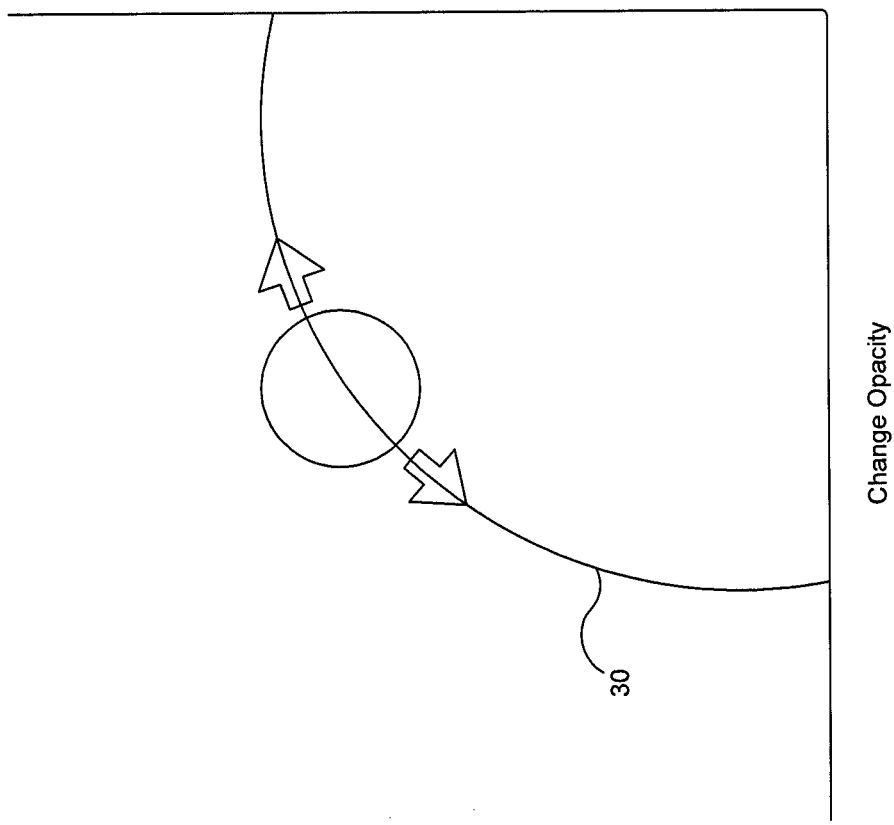

METHOD AND SYSTEM FOR REPRESENTING AUDIENCES IN ENSEMBLE EXPERIENCES

CROSS-REFERENCE TO RELATED APPLICATIONS

This application claims the benefit of U.S. Provisional Application No. 61/505,948 entitled "METHOD AND SYSTEM FOR REPRESENTING AUDIENCES IN ENSEMBLE EXPERIENCES", filed Jul. 8, 2011, and U.S. Provisional Application No. 61/536,481 entitled "METHOD AND SYSTEM FOR REPRESENTING AUDIENCES IN ENSEMBLE EXPERIENCES", filed Sep. 19, 2011, both of which are hereby incorporated by reference in its entirety.

FIELD OF INVENTION

The present invention relates to representing audiences within an ensemble experience, such as providing an interface

SUMMARY OF THE INVENTION

The present invention contemplates a variety of improved methods and systems for representing and interfacing with audiences of a computer implemented ensemble experience. According to one aspect, an ensemble or group experience is provided to a plurality of users. The experience includes displaying content and other information (perhaps in layers) to a specific local user. The specific user is provided an audience representation layer or "swell" interface appearing translucently over the base layer. The audience representation layer includes a plurality of marks providing certain information related to the audience. Each mark is related to an entity such as an audience member, a group, a sponsor, or a celebrity. The local user mark is distinguishable from the other plurality of marks.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

Disclosed herein are details and examples of a "swell" interface, or audience representation layer, representing (through a non-intrusive mechanism) an audience for a group experience such as an ensemble experience. An ensemble experience typically includes a plurality of audience members involved in the experience utilizing a variety of devices with members distributed geographically. The ensemble experience may have various social features, and typically includes a content base layer of live or prerecorded information, as well as any number of other layers to facilitate the ensemble experience. The swell interface operating on a local device provides, to a local participant, information about the ensemble experience, particularly regarding the audience, audience members, groups, etc. The swell interface further enables the user to interact with the audience and respond to information provided therein.

Figure 1:
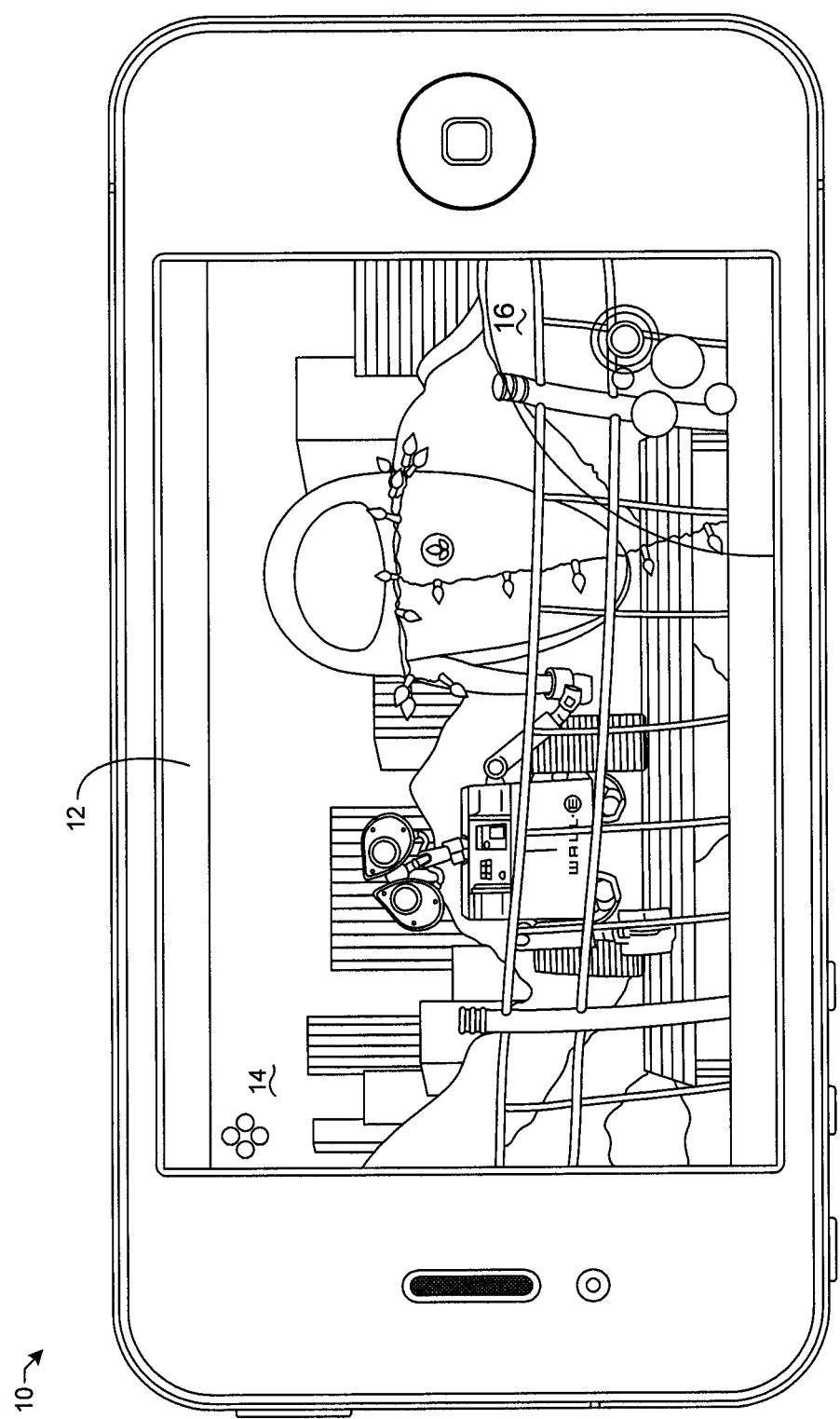
FIGS. 1-18 provide illustrations of various example audience representation layers or interfaces instantiated within particular ensemble experiences according to a multiplicity of embodiments and aspects of the present teaching.

FIG. 1 illustrates a portable device 10 (such as an iPhone®) having a touch screen 12. More details about one possible portable device and an underlying system are described below with reference to FIGS. 19-20. The portable device 10 is being utilized by a participant of a group event, such as an ensemble experience. The group event involves a plurality of users, possibly organized in groups, which can all be considered an "audience." The ensemble experience can include various social aspects, and in this particular case includes a base content layer 14 and an audience representation layer 16, otherwise called a "swell" interface. The ensemble experience may include any variety of other layers and dimensions, such as multiple content layers, video chat layers, etc. More detailed explanations regarding layers, dimensions, ensemble experiences, social aspects and other features are described in co-pending applications * * * * * * *

Figure 1A:
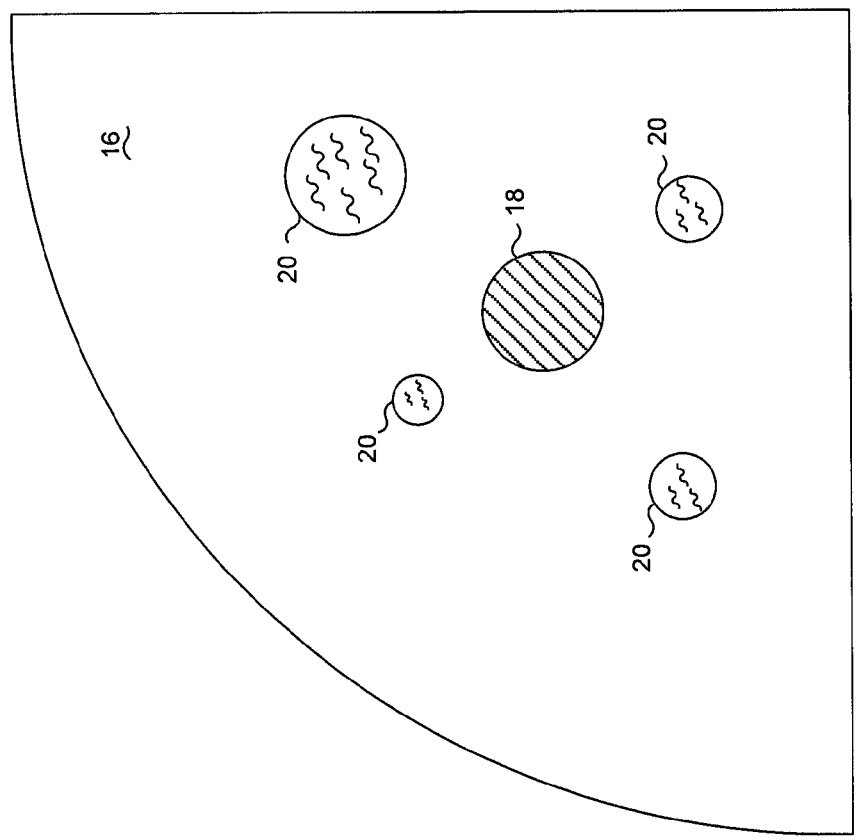

The audience representation layer 16 of FIG. 1 is shown in a possible initial state as a translucent semi-circular wedge apparently overlaying the lower right corner of the base content layer 14. With reference to FIG. 1A for more details, the audience participation layer 16 includes a plurality of marks including a present user mark 18 and other user marks 20.

With further reference to FIG. 1, a mark can represent a variety of different entities. Typically some of the marks will represent other audience members. Additionally, a mark can represent a group of users, active participants, hosts, experts, celebrities, etc. The plurality of users represented by the marks represents the audience or a subset of the audience somehow connected to the ensemble experience. The present user mark 18 corresponds to a local user controlling the portable device 10. The identity of the local user could be determined either by device specification, by login, or any other suitable process.

In some embodiments, the present user mark 18 would be displayed in a first color, in contrast to the other user marks 20 which would be displayed in a second color. The first and second colors could serve to readily distinguish between the present user and other audience members. In other embodiments, each mark could have a distinct color, or a color representative of some feature. For example, if a user is a member of the present user's social graph, different colored marks could be used to indicate a degree of closeness. A certain color could be representative of a group the corresponding user belongs to.

Similar to color, various geometric shapes could be used to provide information about any user associated with a mark. The various figures show circular marks, but squares, triangles, polygons, etc. could all serve equally well. For example, a circular shaped mark could correspond to a "normal" user; a star shaped mark could correspond to a celebrity, etc.

The interface represented by the audience representation layer 16 can be responsive to a variety of different gestures, and/or commands entered into the device 10 via touch screen or any suitable input device. For example, a flipping gesture made with the device 10 could cause colors and/or shapes of the marks to change. Certain gestures/commands could effect only local operation, while others may affect the ensemble experience for other specific users, groups, or the entire audience. Of course context could determine how the command operated.

Figure 2:
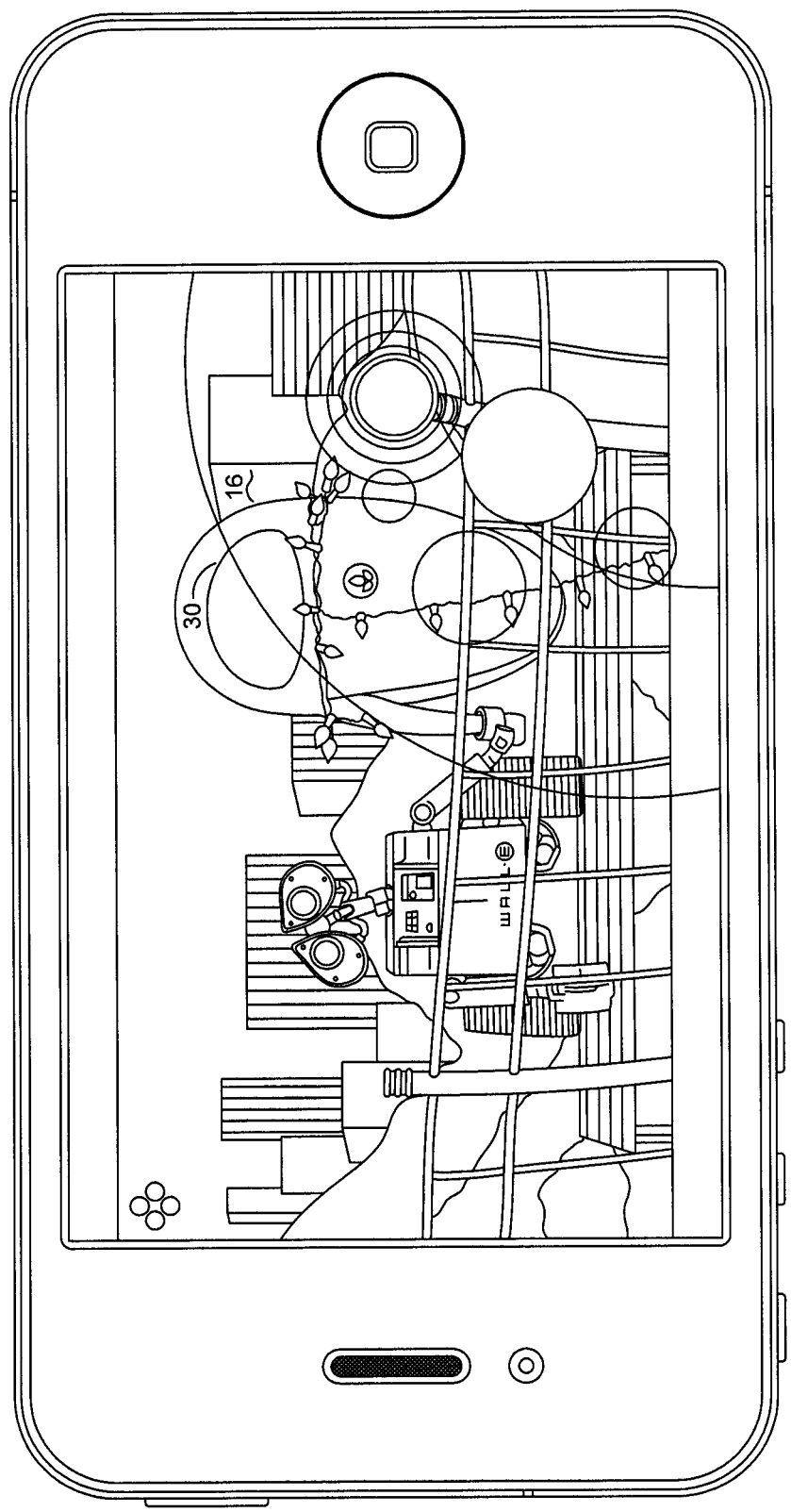
Figure 2A:
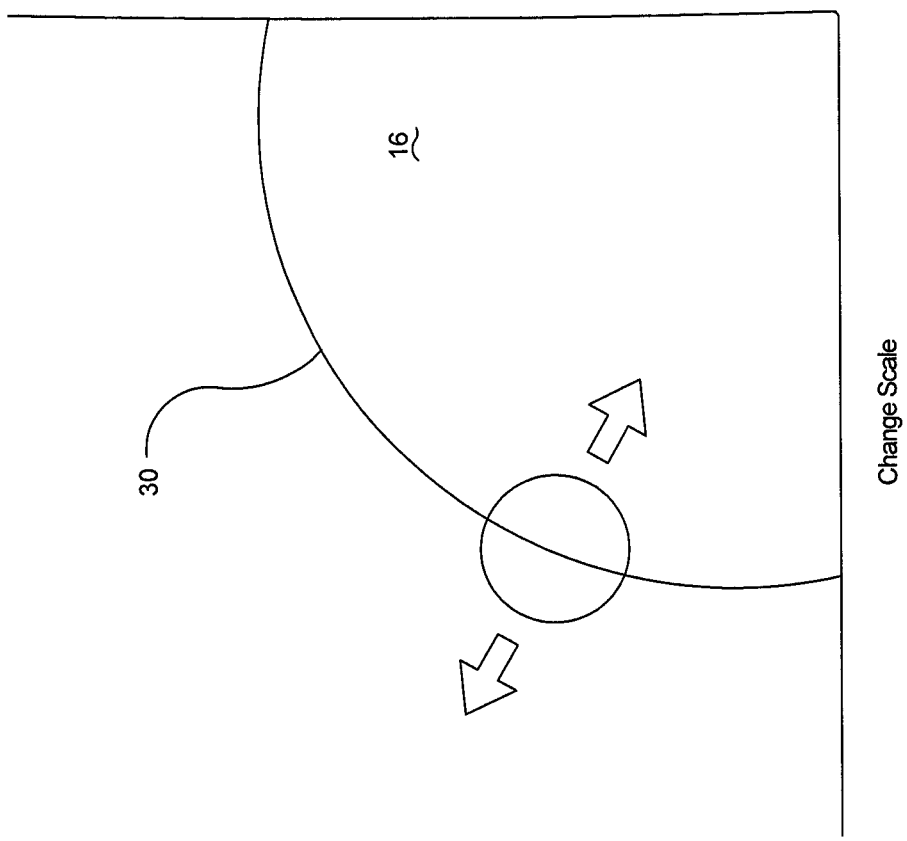

FIGS. 2-2B are now used to describe how the wedge shape or 'Swell Boundary' could function as the controls to change the scale (and hide) as well as adjust opacity of an audience representation layer 16. This scale or size control could be a discoverable control mechanism or have a subtle hint to guide the present local user. As shown in FIG. 2A, a user selecting a boundary 30 of the audience representation layer 16 can adjust scale by moving the selection essentially perpendicular to the boundary 30. As shown in FIG. 2B, a user selecting a boundary 30 of the audience representation layer 16 can adjust opacity by moving the selection along the boundary 30. Opacity default and behavior could be anything. In an extreme case, by allowing the user to render audience representation layer 16 fully transparent (i.e., invisible) the user can in essence turn off the visual aspect of the layer 16. In some embodiments, this could result in all features being turned off, or the features and controls could still be operational even though invisible. Scale and opacity controls could be provided in a variety of suitable ways that should be apparent from the present disclosure.

Figure 3:
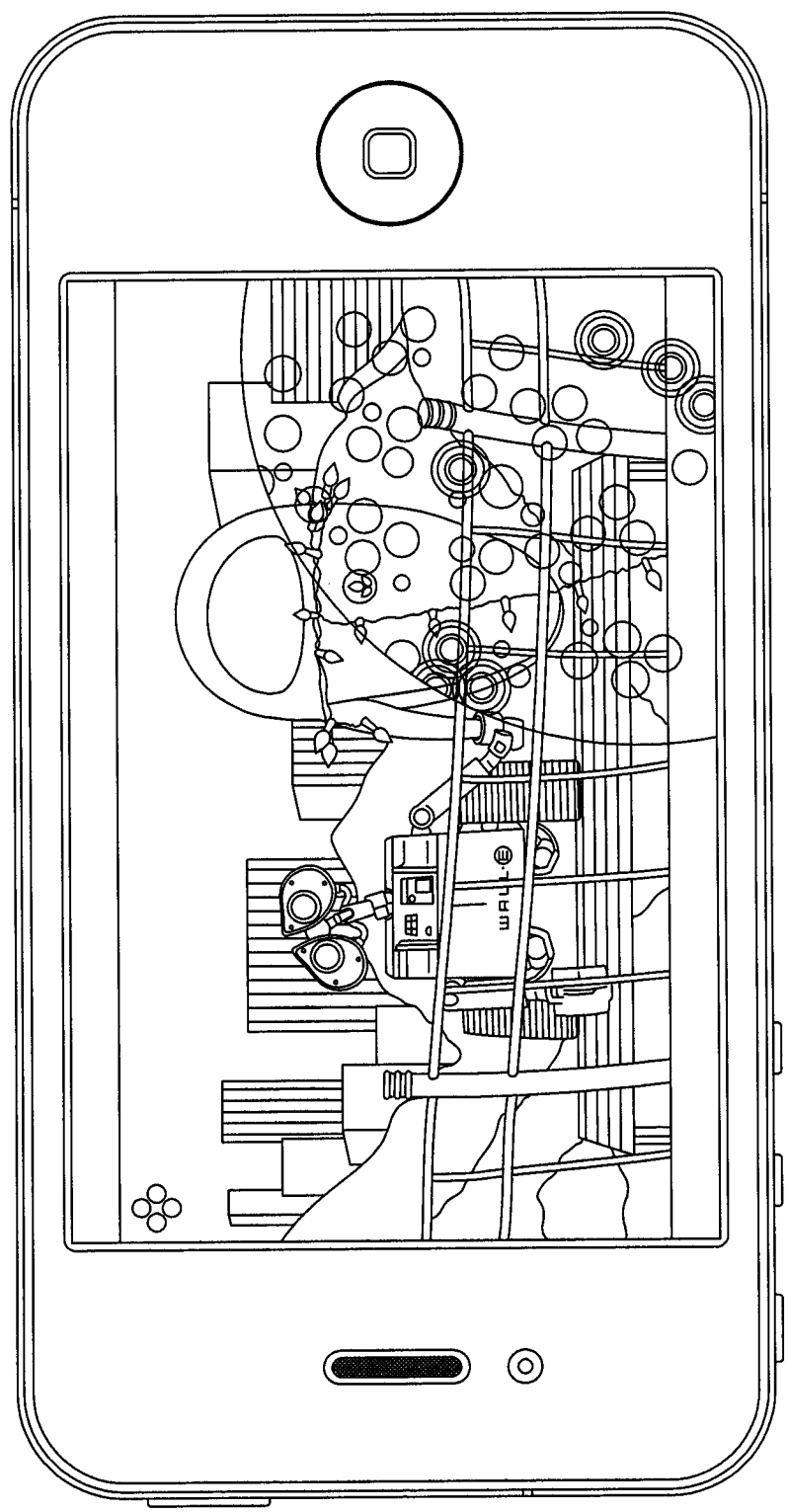

FIG. 3 will now be used to describe one embodiment suitable for handling exceptionally populated events. As seen in FIG. 3, an audience representation layer 16 includes a relatively large number of marks representing a multiplicity of audience members. In well attended events audience representation must be handled adeptly, else the large number of audience members could render the audience representation layer 16 awkward. For example, either the marks must be too small to be of use, or the layer 16 so large it obstructs viewing of other layers. In this embodiment, it is recognized that it may be useful to control the scale and size of the layer 16. At certain times the local user may wish to shrink the layer 16, and this can be accomplished by pinch gesture within the wedge shape. Depending upon the settings, this could shrink the window (i.e., leave the mark size unchanged), or scale all aspects. Either operation could have a certain benefit.

In a related embodiment, the local user may be able to navigate about the audience representation layer 16 by moving the viewing window. In other embodiments, the local user can merge (or decouple) marks to help organize the audience representation layer as desired. In this case, a specific color and/or geometric shape could indicate that a particular mark is the merger of two or more marks, and thus could be expanded if desired.

Figure 4:
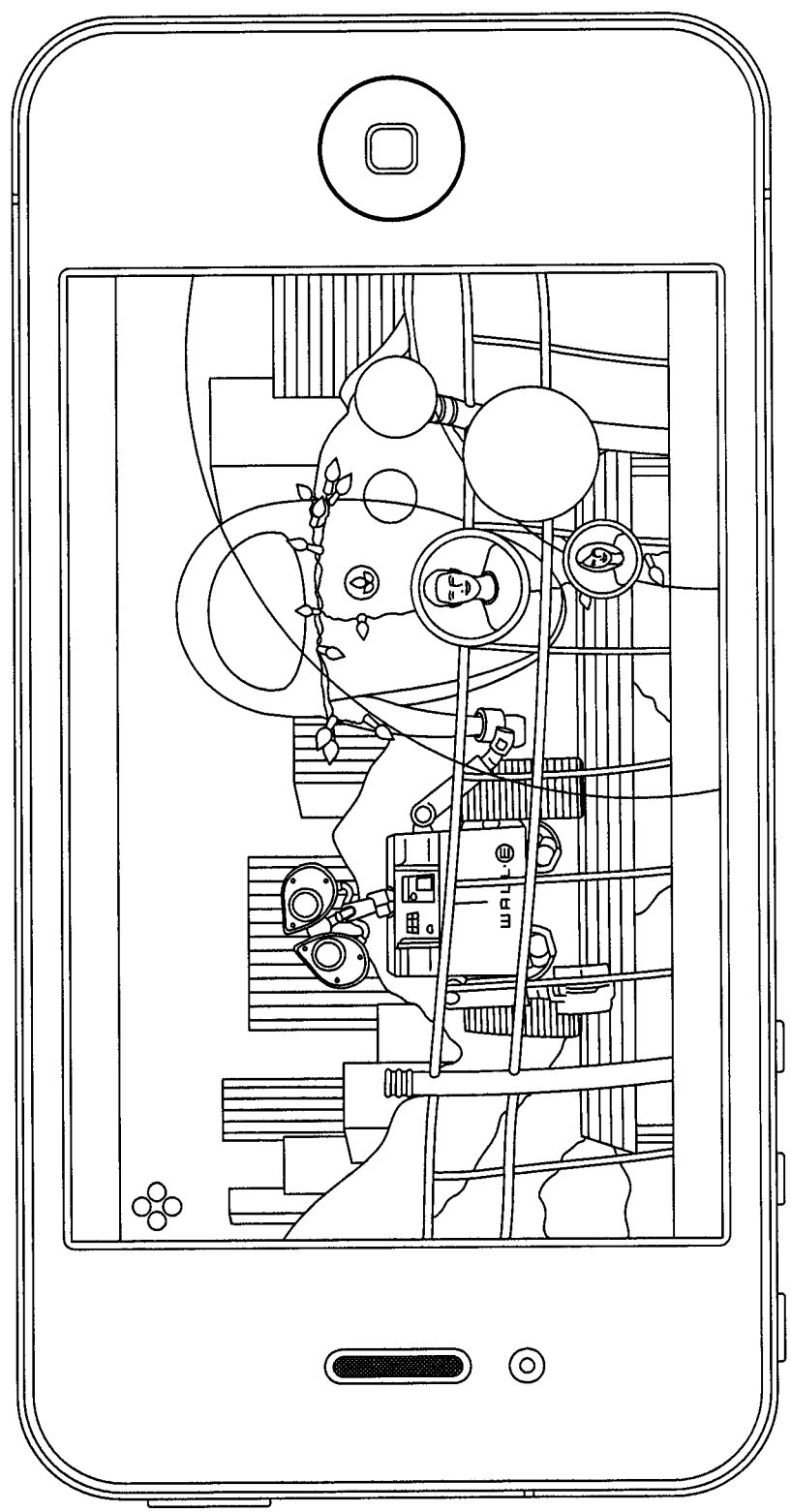

FIG. 4 will now be used to described certain aspects for the local user to interact with other users and/or groups represented by the marks. The swell interface excels as a mechanism to instantly convey the notion of group as well as audience behavior and disposition, and we are easily able to find and interact with people. In one embodiment, selecting (e.g., a single tap on) a given mark results in introducing the corresponding audience member. In some cases, and depending on context or user setting, an image of the user could replace the mark. Another selection might initiate communication or a request to friend. Another selection might toggle the mark back to the original state. Yet another selection could result in the mark being deleted, at least locally, from the audience representation layer 16. Another selection, such as holding selection for a moment, could invoke a toolbar providing a variety of additional options available between users, including form a connection and mark as a favorite.

Figure 5:
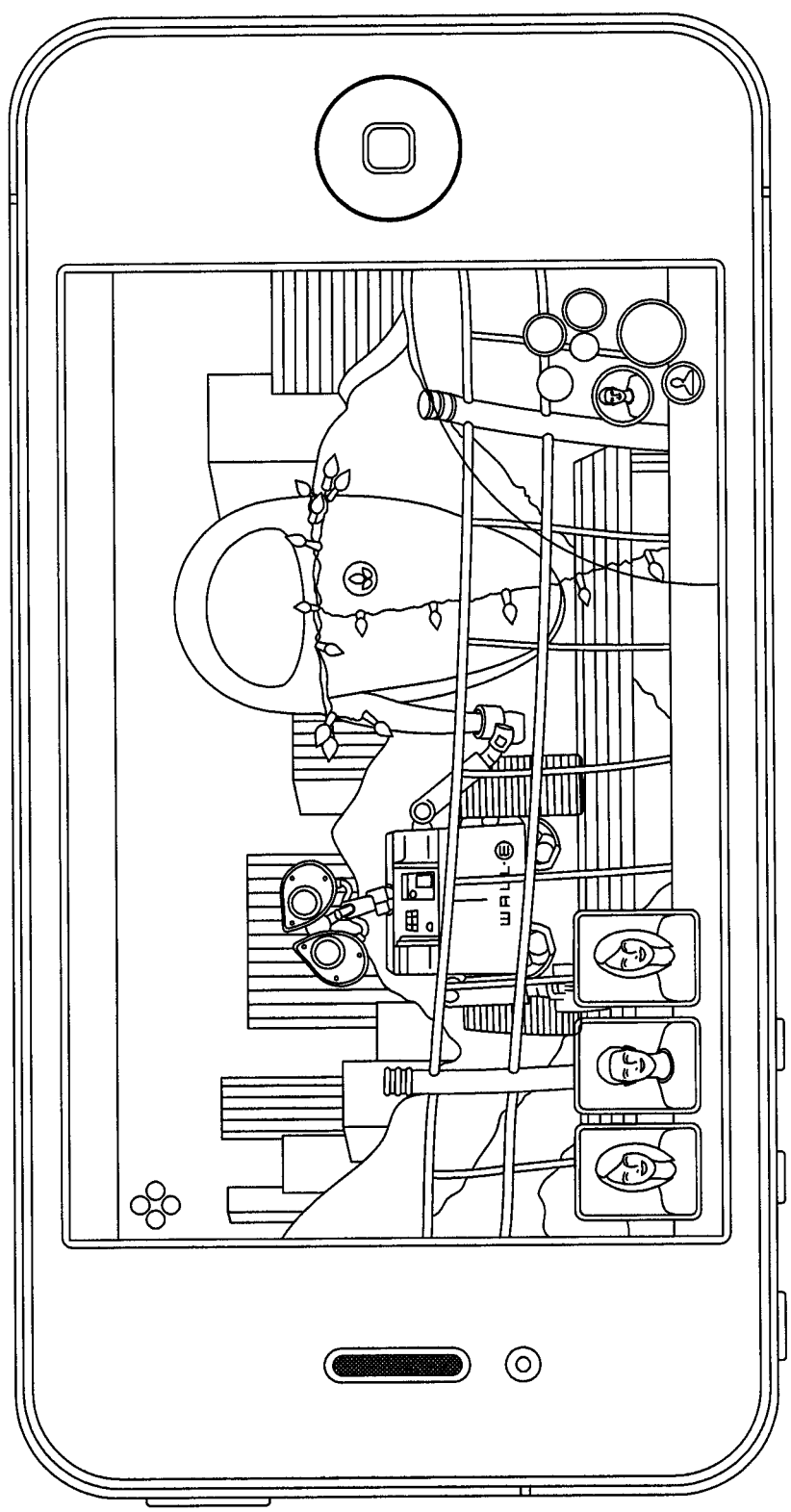

FIG. 5 illustrates some other mechanisms for the swell interface or audience representation layer 16 to be used to initiate actions, and form connections. In FIG. 5, three users' marks have been selected to form a three way video chat. The marks in the layer 16 have been scaled to represent a relationship to the local user, and images of active users have replaced solid color marks. The swell also displays when other users are connected (or interacting). Scale of the marks, as well as of the interface, could represent activity, idle state, user or group role, and/or association. Other movements could indicate social behavior or other activity. By way of examples, a mark shaking could correspond to a user clapping, a mark pulsing could correspond to another action or gesture, a mark rippling could correspond to an action directly effecting other users, and thus could have a visual effect on the other users' marks, etc.

Figure 6:
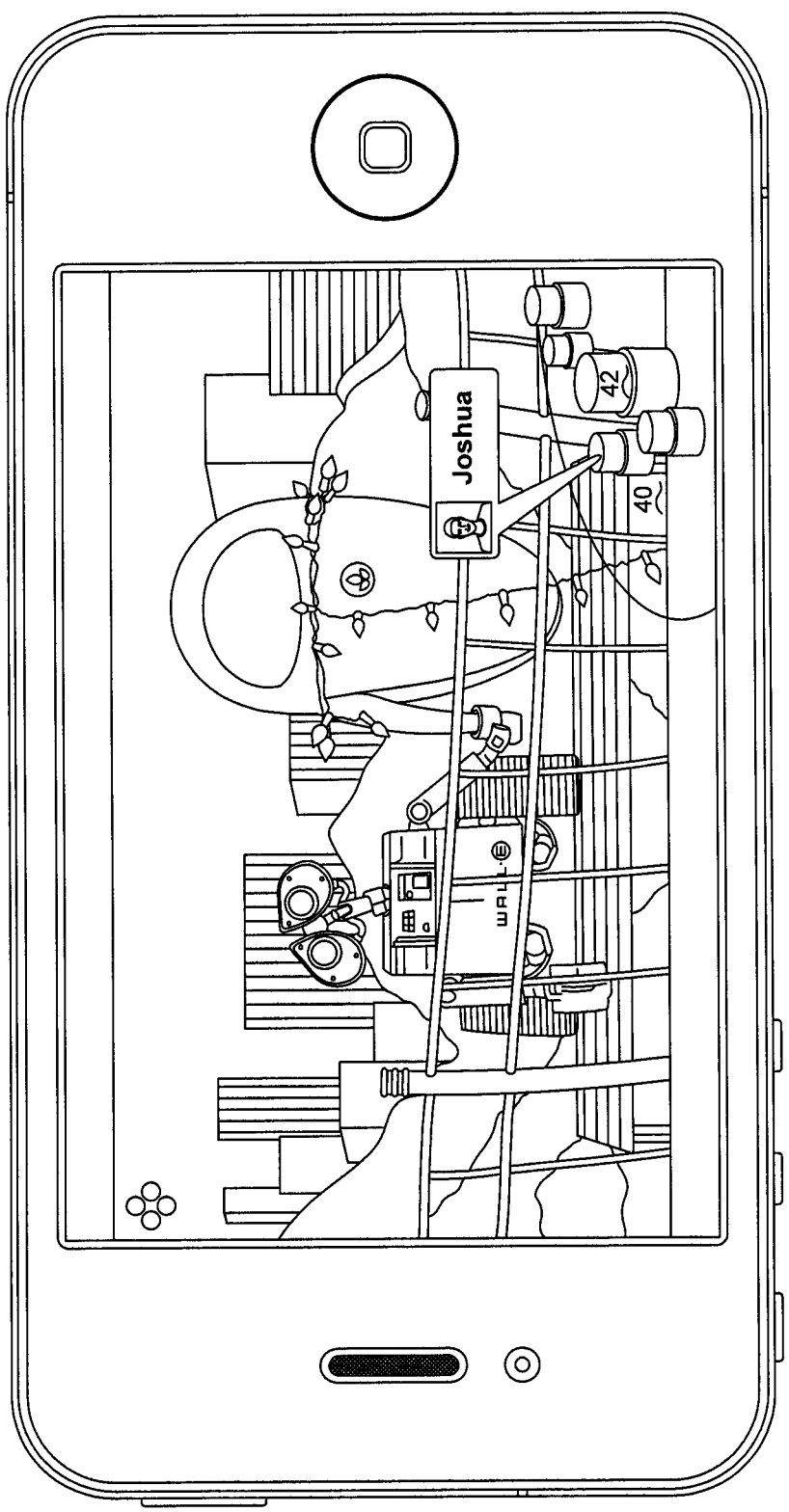

FIG. 6 illustrates by way of example how certain embodiments can morph to a formal representation of a person, group, or other type of audience member. The formal representation could take any variety of useful forms depending upon the desired application. In the example of FIG. 6 specifically, the user can shift the viewing angle of the swell interface and see a quasi 3d representation layer 40 of the audience. The marks could become cylinders 42 (as shown), but could be any shape like stick figures or skeletons or any 3d avatar. Imagine a gaming context with multiple players; each side could have a uniform and each user a specific avatar in the uniform. In another embodiment, the marks could take on a shape meaningful in the context of the other layers and/or the nature of the event. For example, if the event is surrounding group watching of a football game, the marks could take the shape of footballs or football helmets.

Figure 7:
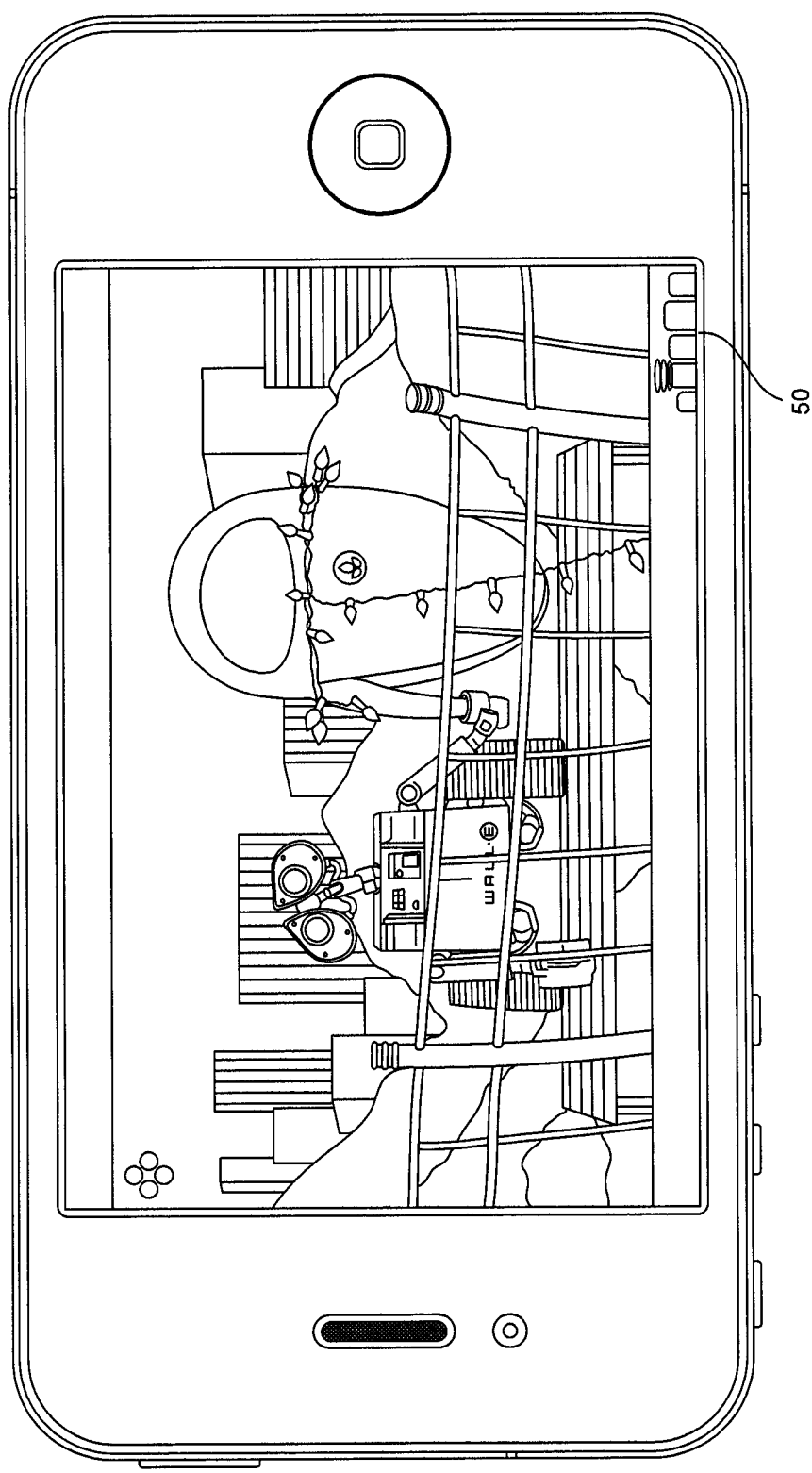

FIG. 7 illustrates how the swell interface can be reduced to a smaller, non-intrusive display layer 50 which could still provide some, perhaps limited, amount of information related to the audience, as well as different interface functionality. The local user could then toggle between all the various forms of the layer such as layer 16, layer 40, and/or layer 50.

Figure 8:
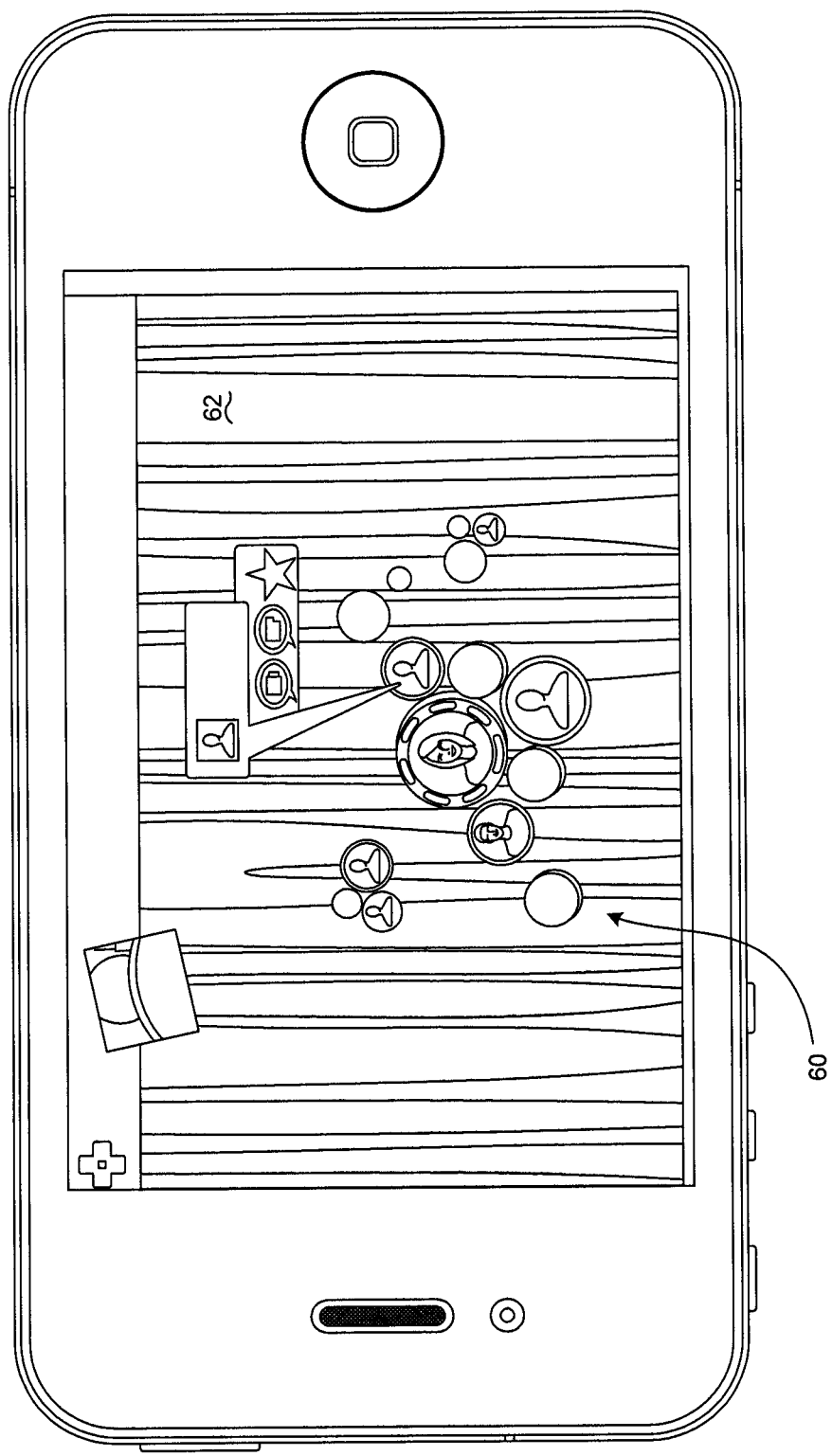
Figure 9:
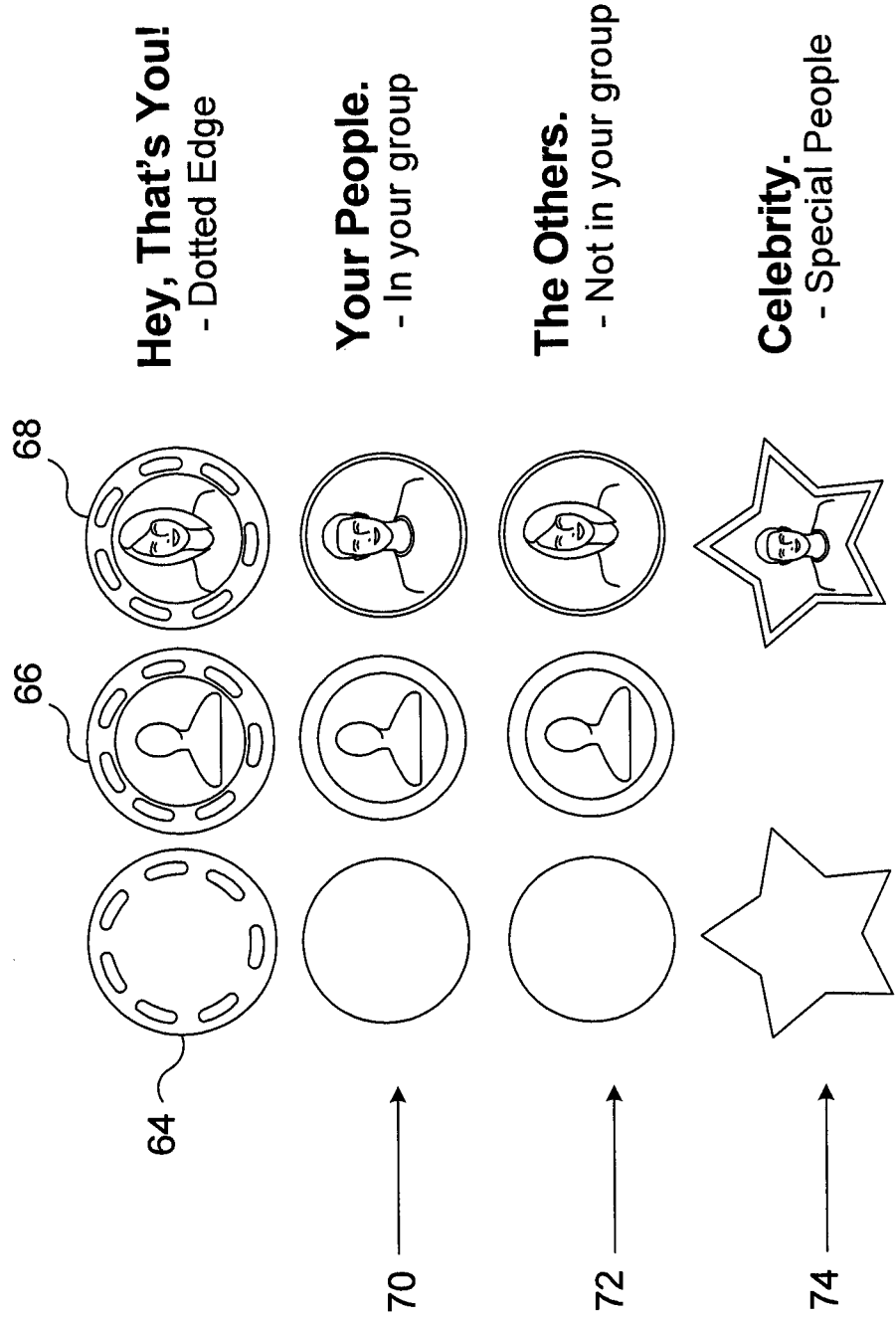

FIGS. 8-9 illustrate one embodiment of a swell interface or audience representation layer 60 according to another aspect of the present teaching. In FIG. 8, the audience representation layer 60 is part of or provides a pre-show or "lobby" aspect of an ensemble experience, and is initially provided as or swells to substantially cover the entire display of the user device, and may be completely opaque, or there may just be no other active layers. For example, this may relate to an impending entertainment ensemble experience involving a show such as a video event, or a live performance. The audience representation layer 60 can be provided with some meaningful cliché for context, such as a curtain backdrop 62.

The plurality of marks found in the swell interface 60 of FIG. 8 has certain variety which is now explained further with reference to FIG. 9. First in FIG. 9 are shown three possible variations on a local user mark. Local user mark 64 is circular with a hashed emphasis line around a boarder; local user mark 66 is similar but includes an avatar or other meaningful image; local user mark 68 is again similar but includes a thumbnail image of the present user. User marks 70 provide three example marks with features distinguishing such marks as being part of your social network, or having some other defined relationship to the local user. User marks 72 provide three example marks with features (or lacking features) distinguishing such marks as being outside of your social network, or having some other defined relationship to the local user. User marks 74 provide two examples of mark shapes and/or designs selected as a star design to indicate that the associated user is a celebrity. As will be appreciated, there are a wide variety of possible style choices for the marks which can be used to provide meaningful information.

Figure 10:
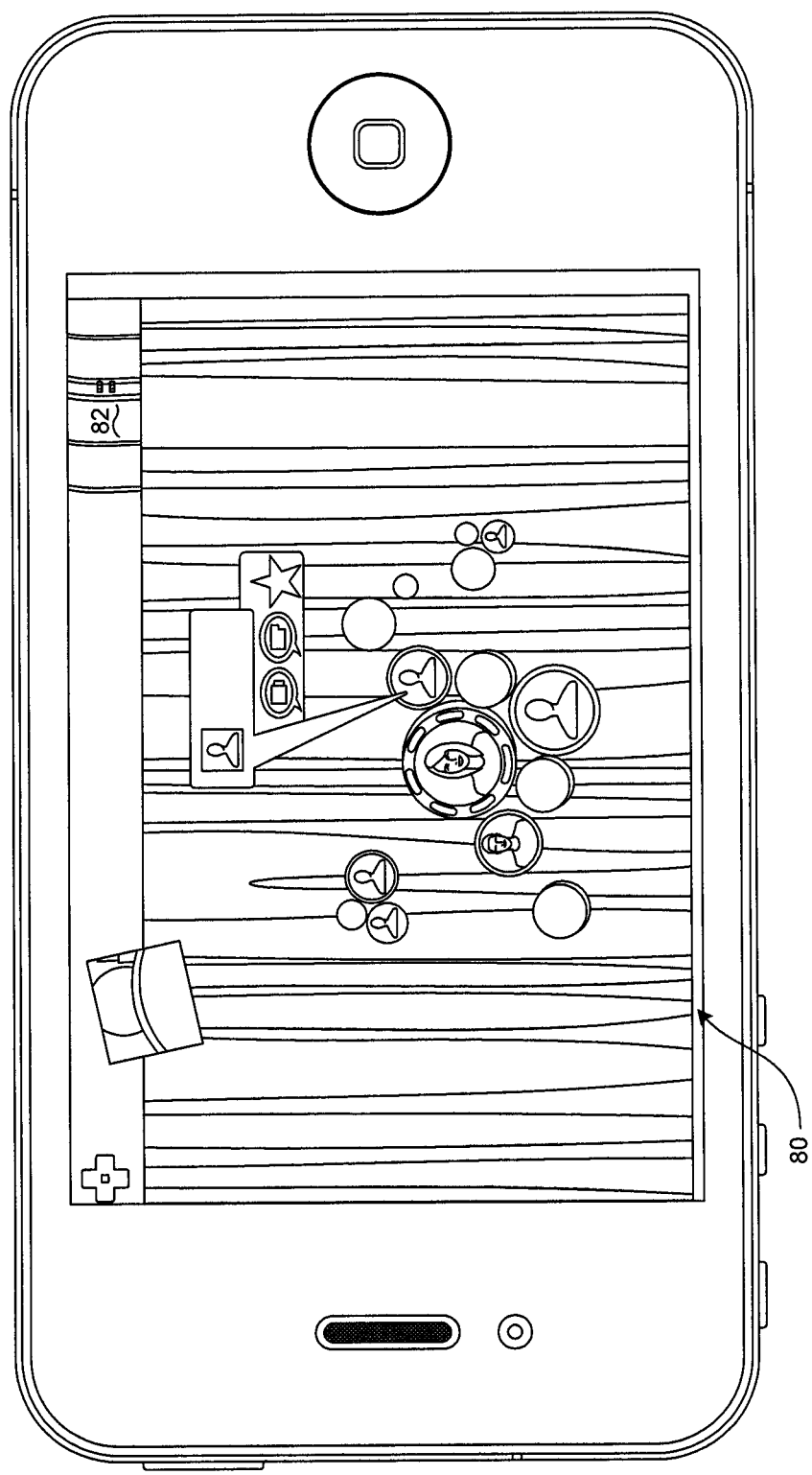

FIG. 10 illustrates a swell interface or audience representation layer 80 including a clock or countdown timer 82. Clocks and timer provide interesting detail within the ensemble experience universe. Layer 80 may include a countdown timer 82 that is elegant, and based upon circular movement.

Figure 11:
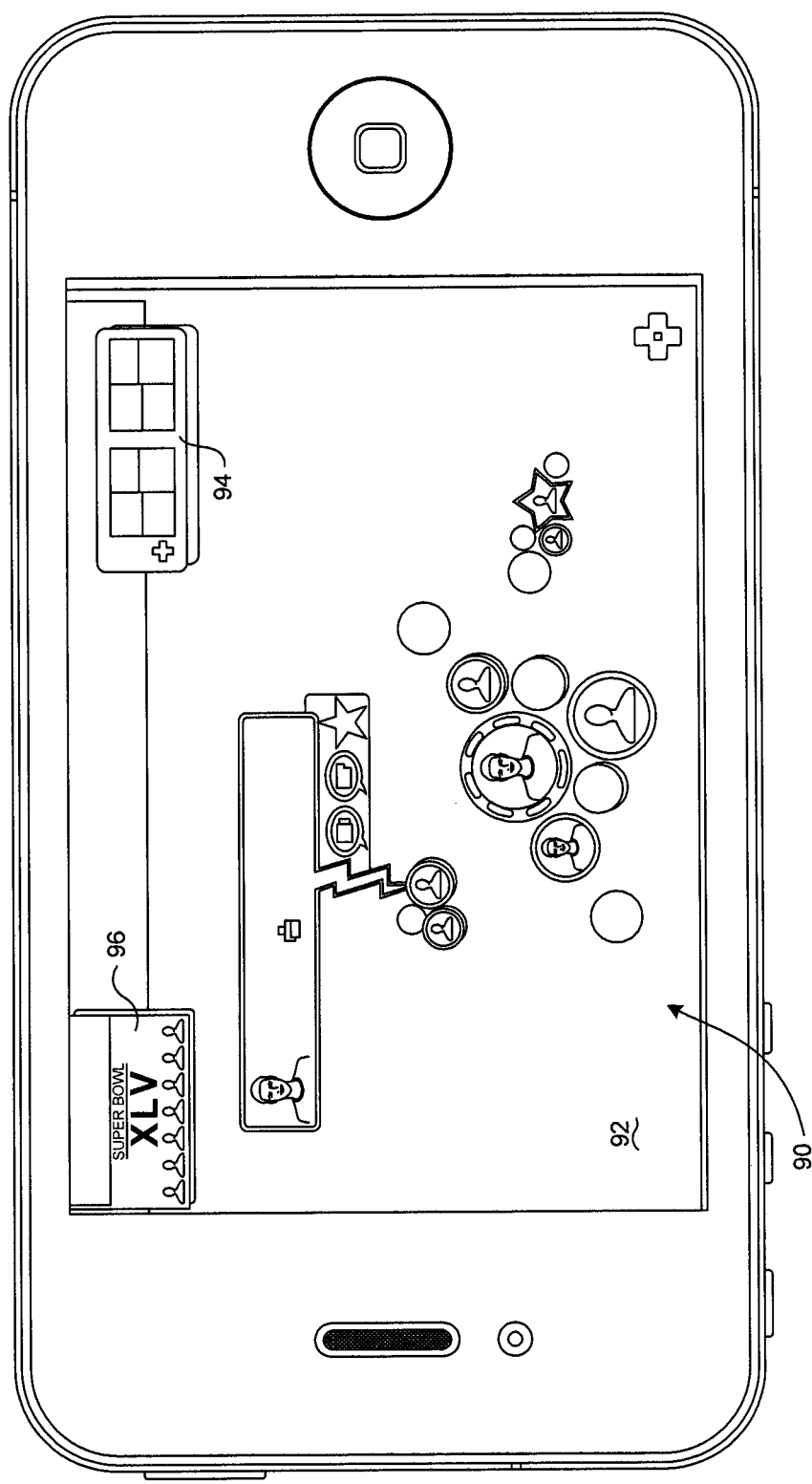

FIG. 11 illustrates yet another swell interface or audience representation layer 90, this time in the context of a pre-show aspect of a sporting event or ensemble experience. The swell layer 90 includes a grass field backdrop 92 (another useful cliché), a sporty flip clock 94, and a meaningful header 96. The grass field backdrop 92 and sporty flip clock 94 are useful to provide context and atmosphere to the sporting nature of the event. The meaningful header 96 can provide a variety of additional information, such as sponsor information, event details, and/or advertising.

Figure 12:
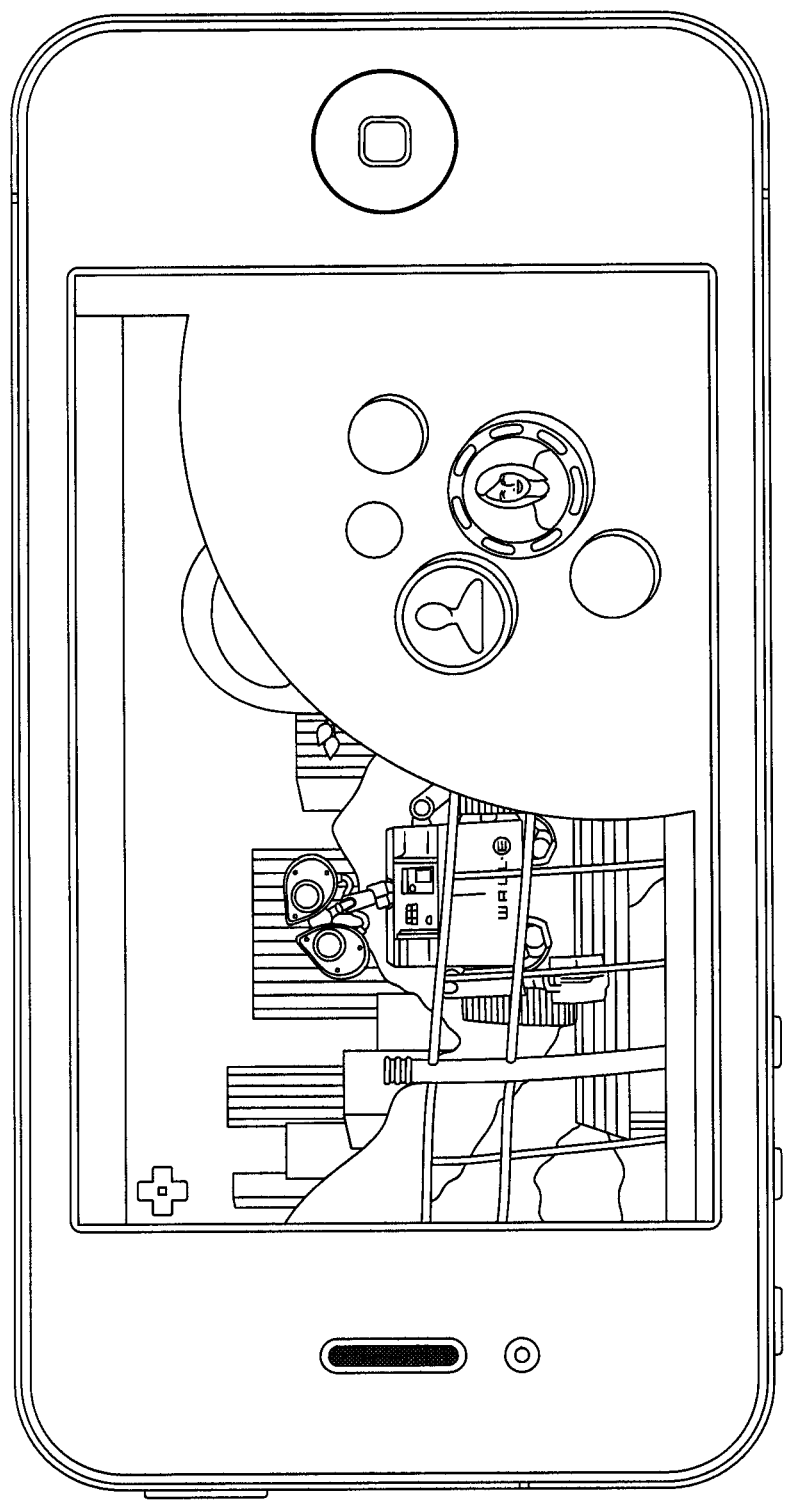

Once the pre-show aspects have completed, FIG. 12 illustrates how the relevant swell interface or audience representation layer goes into another mode, such as the wedge translucent mode described in some detail above. This mode could be automatic at some point in the experience, and/or the user could manually toggle between modes.

Figure 13:
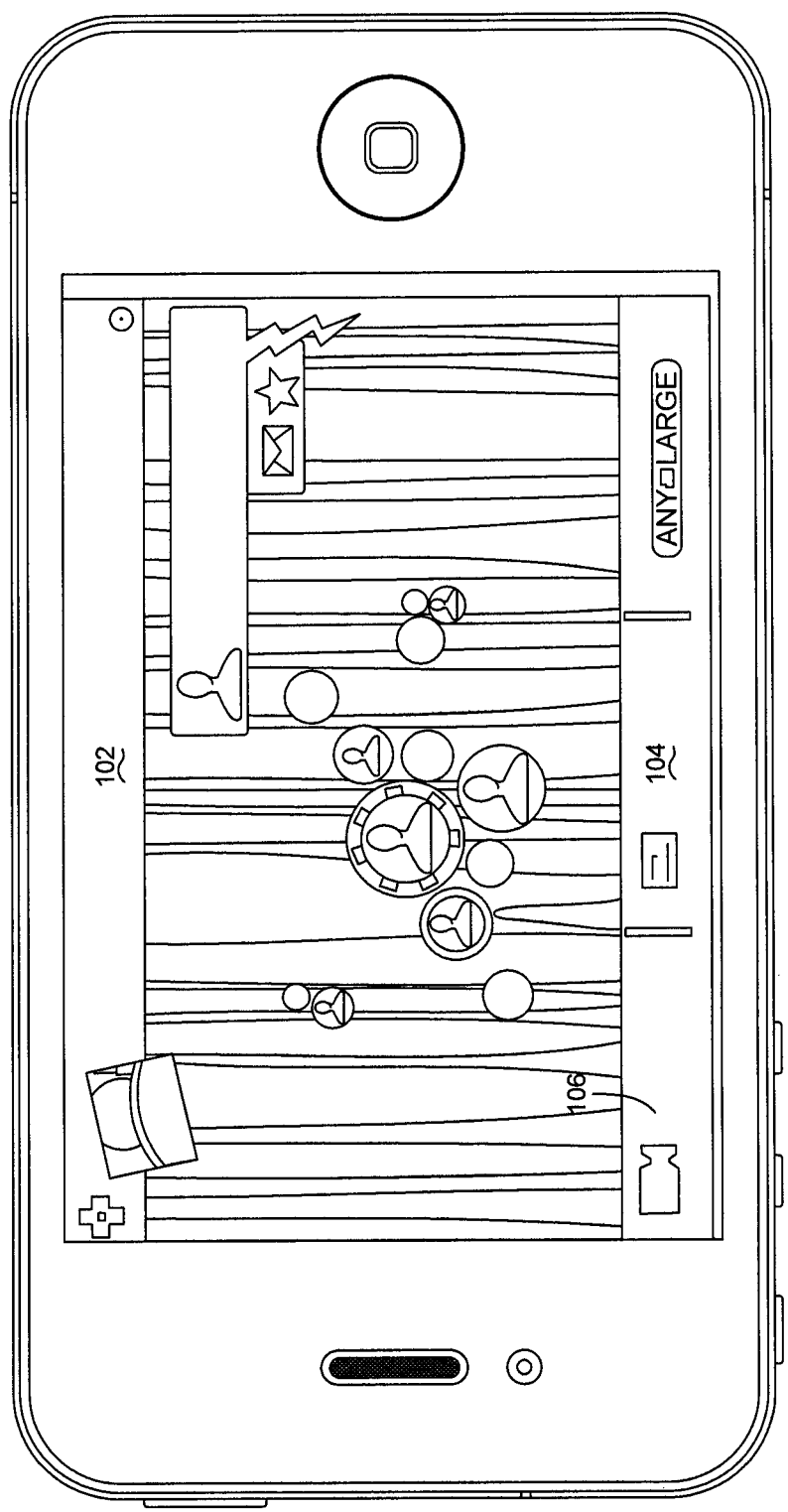
Figure 14:
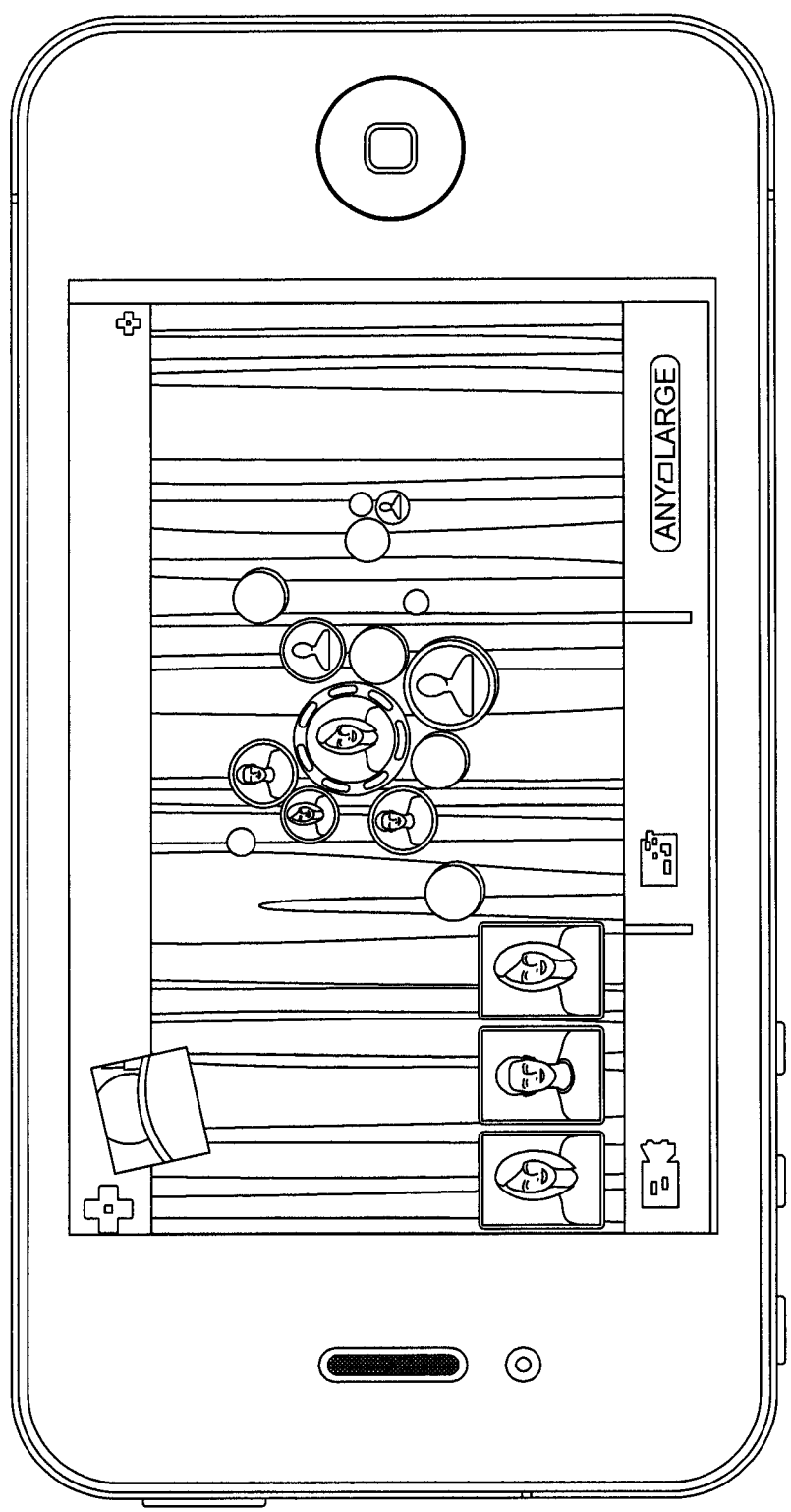

FIGS. 13-14 illustrate by way of example a post-show aspect of an ensemble experience, in this example a movie event. Here the basic swell or audience representation functionality is available. A header 102 can update to display a relevant message, e.g., event over or thank you. A bottom or options bar 104 is provided with other buttons, such as a "more like this" button 106 to take users to other events or a sponsor page. Other functionality not explicitly shown in the interface could be part of the post show layer/aspect. For example, the layer may provide user departure alert, and/or provide email and favorite links. User marks could convert into other shapes, perhaps to indicate ongoing aspects of this event. For example, a star user mark could begin blinking to indicate that the associated star is going to have a separate Q&A session that can be accessed by selecting the relevant mark. FIG. 14 specifically illustrates a post show video chat session above the options bar 104.

Figure 15:
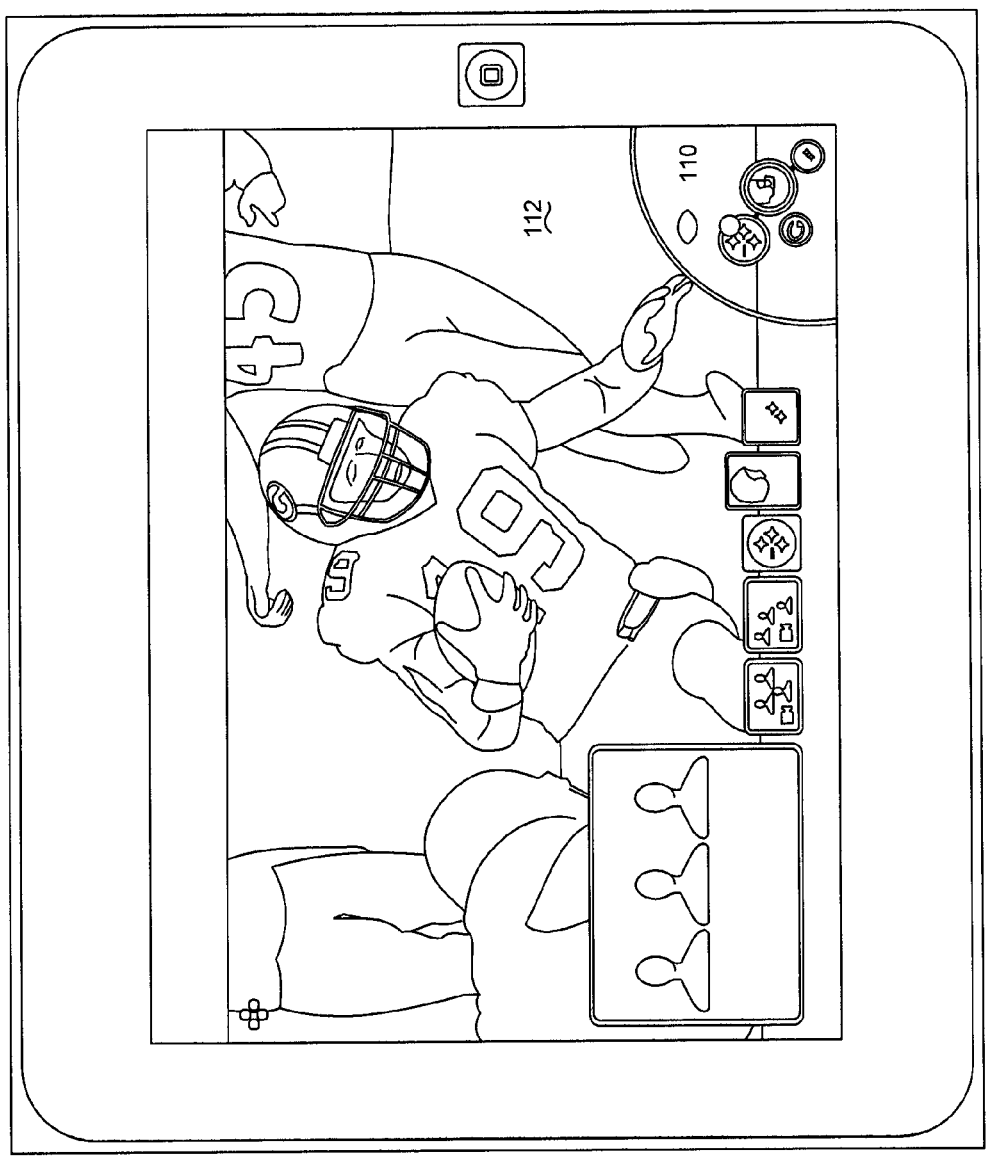

With reference to FIGS. 15-18, a variety of other features and aspects will now be described. FIG. 15 illustrates a swell interface or audience representation layer 110 for a football game event. A base content layer 112 could represent a live or prerecorded game. In layer 110, some of the marks are branded. These could represent the league (e.g., NFL), the team, or another sponsor or entity. Users could select these representations to show solidarity with their team, and these could be sponsored marks. For example, users may either be required to pay a small fee to join in the ensemble experience, or alternatively allow their mark to indicate a sponsor. In some embodiments, users can create their own images for use with marks, or a library of images can be made available, perhaps at a small cost.

Figure 16:
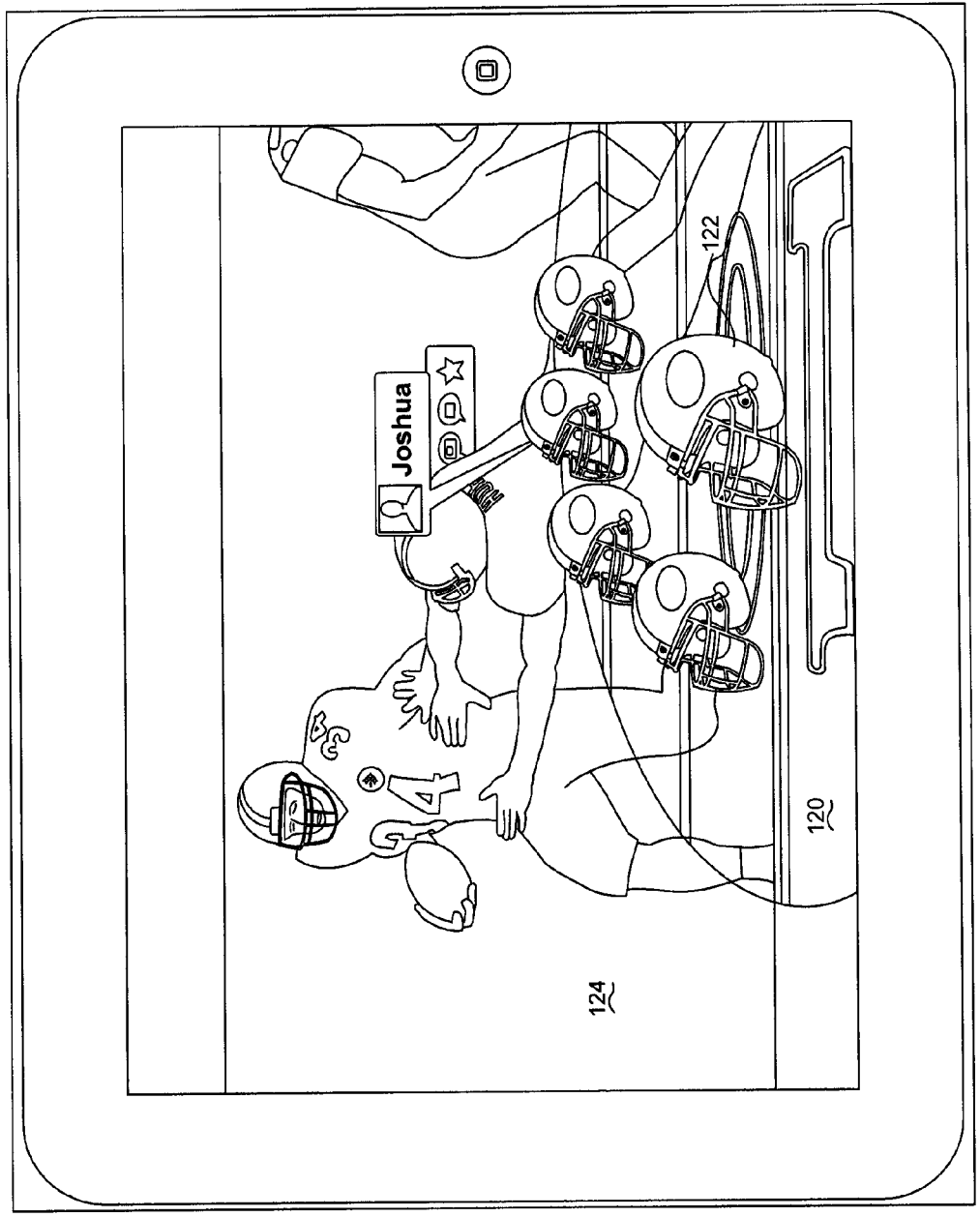

FIG. 16 illustrates a swell interface or audience representation layer 120 for a football game event. A base content layer 124 could represent a live or prerecorded game. Here marks such as mark 122 take on the shape of a football helmet, thus providing enhanced meaning in this context. Likewise, the shape of the swell interface layer 120 could be a football or portion of a football.

Figure 17:
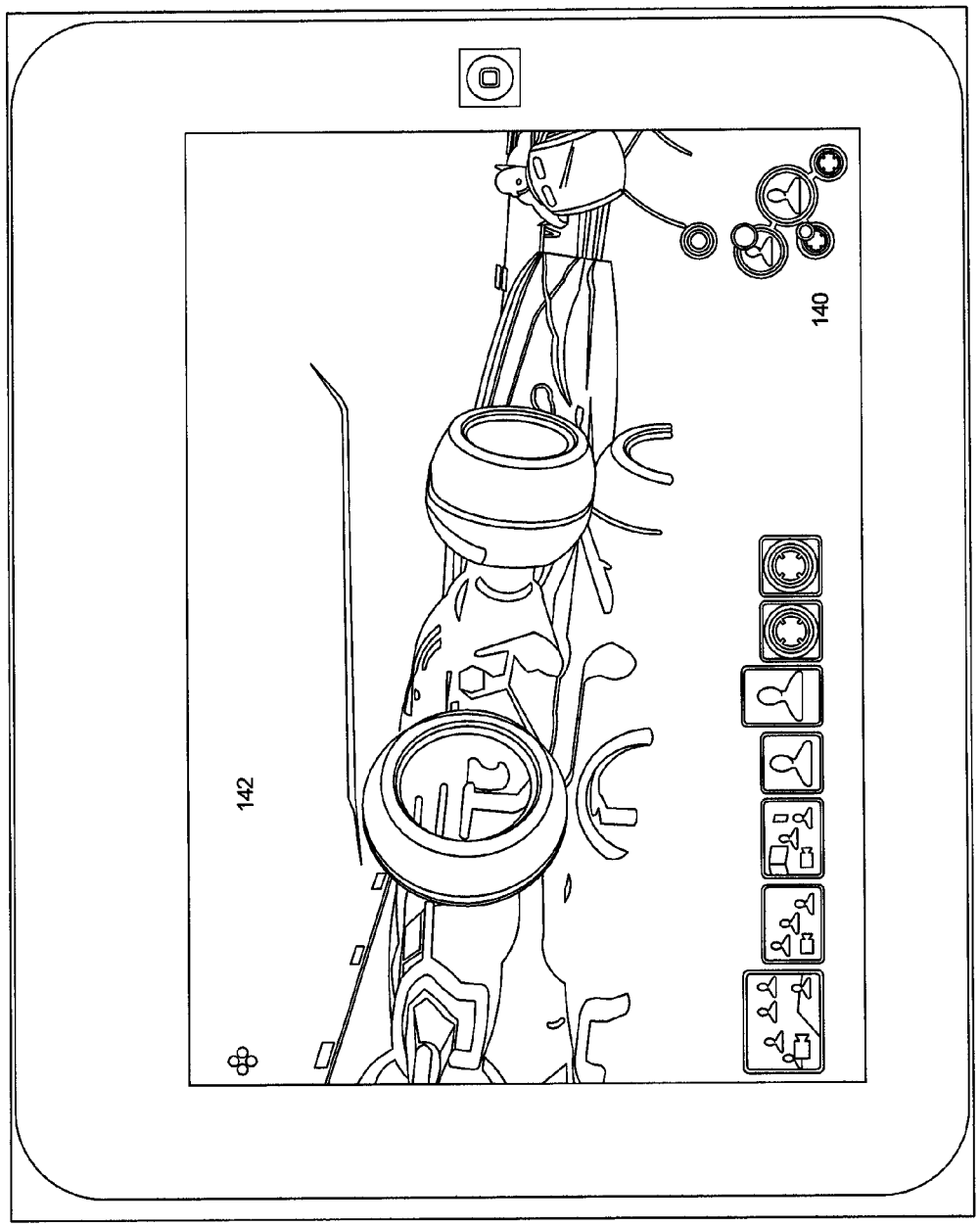
Figure 18:
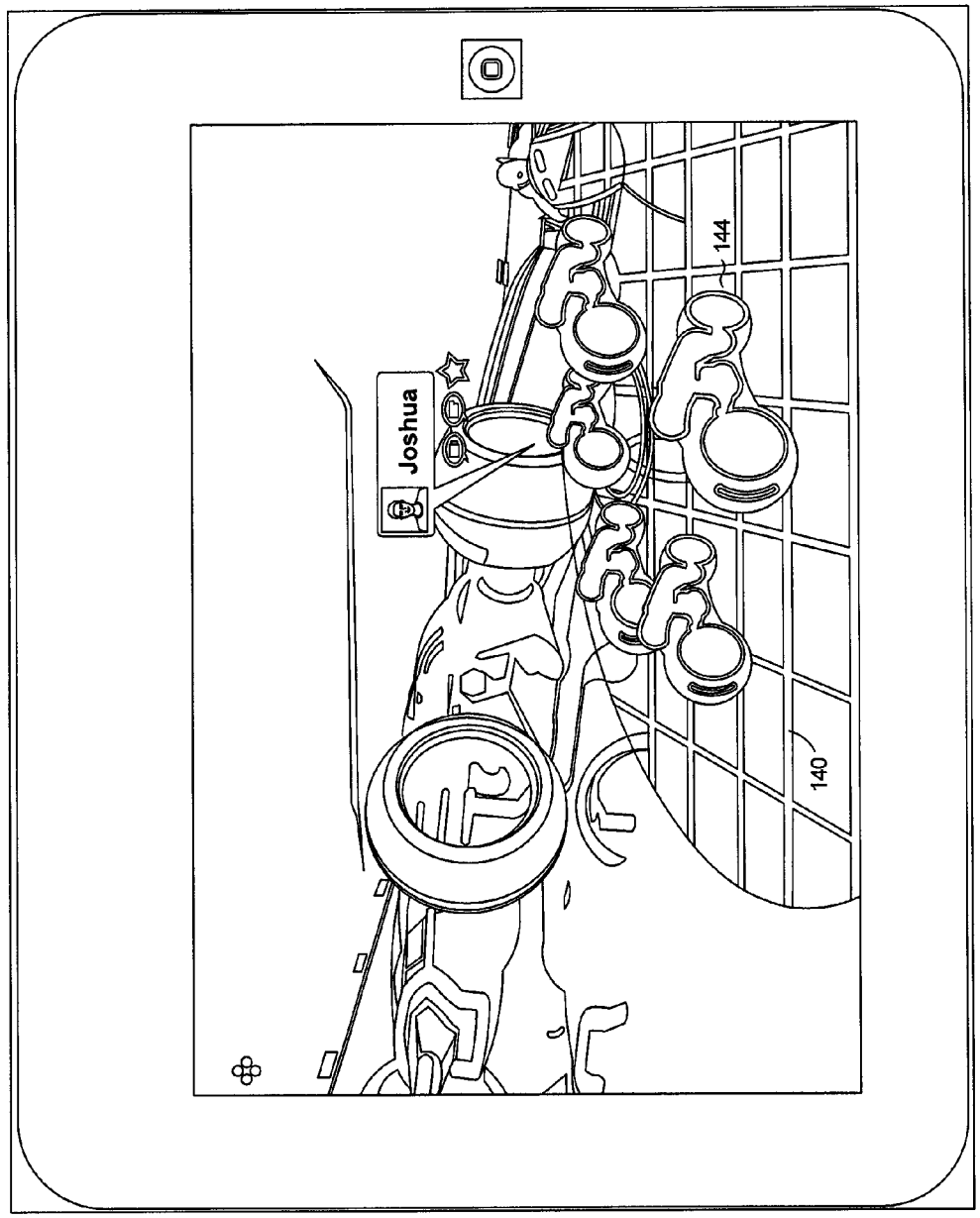

FIGS. 17-18 illustrate a swell interface or audience representation layer 140 or 140' over a base game content layer 142. Here the game is a racing game, and the user can toggle between layers 140 and 140'. The swell interface layer 140' provides a quasi-3d layer, with meaningful marks such as motorcycle mark 144.

Figure 19:
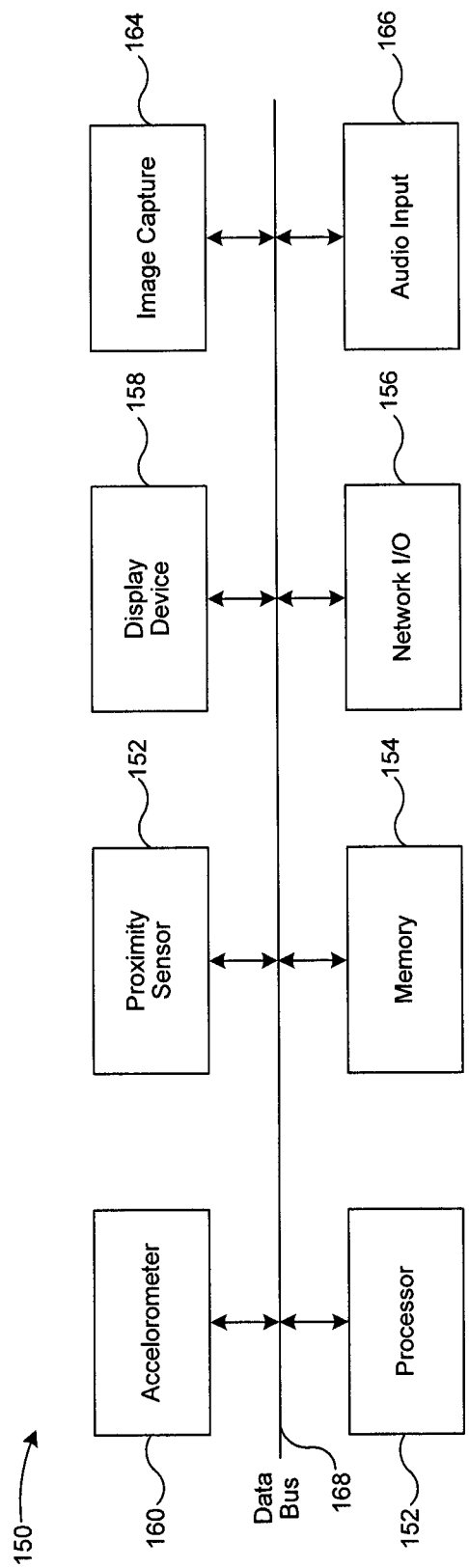
FIG. 19 is a block diagram of a portable device according to one embodiment of the present invention.

FIG. 19 illustrates a portable device 150 suitable for use by a participant in accordance with one embodiment of the present invention. The portable device 150 architecture and components are merely illustrative. Those skilled in the art will immediately recognize the wide variety of suitable categories of and specific devices such as a cell phone, an iPad, an iPhone, a portable digital assistant (PDA), etc. The portable device 150 includes a processor 152, a memory 154, a network i/o device 156, a display device 158, and a plurality of sensors such as accelerometer 160, a proximity sensor 162, a image capture device 164, and an audio input device 166, all in communication via a data bus 168. The processor 152 could include one or more of a central processing unit (CPU) and a graphics processing unit (GPU). The portable device 150 can work independently to sense user participation in an event, and provide corresponding event feedback. Alternatively, the portable device 150 could be a component of a system which elements work together to facilitate the event.

Figure 20:
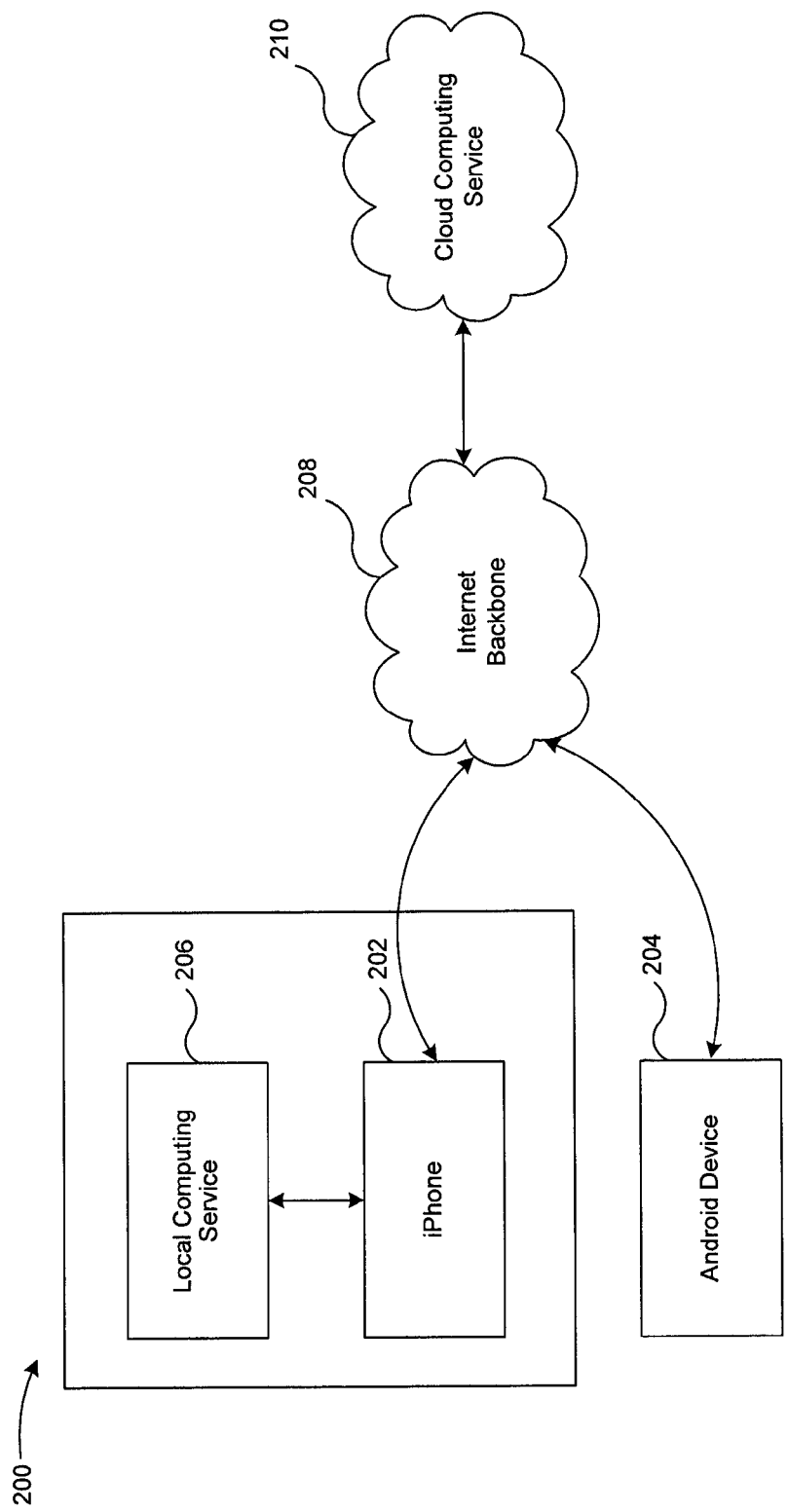
FIG. 20 is a block diagram of a system according to one embodiment of the present invention.

FIG. 20 illustrates a system 200 suitable for facilitating an ensemble event involving a plurality of participants. The system 200 includes a plurality of portable devices such as iPhone 202 and Android device 204, a local computing device 206, and an Internet connection coupling the portable devices to a cloud computing service 210. In this embodiment, gesture recognition functionality is provided at the portable devices in conjunction with cloud computing service 210, as the application requires. In one example, the system 200 could provide a social experience for a variety of participants. As the participants engage in the social experience, the system 200 can ascertain the variety of participant responses and activity. As the situation merits, the system can facilitate participation, and provide a swell interface when appropriate. Each participant can have unique feedback associated with their actions, such as each user having a distinct sound corresponding to their clapping gesture. In this way, the event has a social aspect indicative of a plurality of participants.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

I claim:

1. A computer implemented method for representing an audience during an ensemble experience, the computer implemented method comprising:
providing an ensemble experience to an audience being a plurality of users, including displaying on a device of a specific user, content associated with the ensemble experience in a base layer;
providing to the specific user an audience representation layer appearing translucently over the base layer, wherein the audience representation layer includes a plurality of marks providing certain information related to the audience, one of the plurality of marks being a specific user mark distinguishable from the other plurality of marks, the specific user mark indicative of the specific user;
providing at a curved boundary of the audience representation layer user controls for adjusting size and opacity of the audience representation layer;
wherein the device includes a touch screen, and providing user controls includes:
responding to a sensed touch gesture in a direction substantially perpendicular to the curved boundary of the audience representation layer by expanding or contracting the audience representation layer according to the gesture; and
responding to a sensed touch gesture in a direction substantially tangent to the curved boundary of the audience representation layer by decreasing or increasing opacity of the audience representation layer.

2. A computer implemented method as recited in claim 1, wherein providing the audience representation layer includes opening the audience representation layer by swelling the audience representation layer to overlay a defined portion of the base layer.

3. A computer implemented method as recited in claim 2, wherein the audience representation layer swells into a wedge shape.

4. A computer implemented method as recited in claim 1, wherein each of the plurality of marks identifies a unique user.

5. A computer implemented method as recited in claim 4, wherein the specific user mark has a first color, and the other marks have a second color, wherein the first color and the second color are distinguishable.

6. A computer implemented method as recited in claim 5, wherein the plurality of marks are circular in shape.

7. A computer implemented method as recited in claim 6, wherein the specific user mark and the other marks have different shapes.

8. A computer implemented method as recited in claim 5, wherein the device is responsive to a gesture to provide a control input to the audience representation layer.

9. A computer implemented method as recited in claim 8, wherein the gesture is a flipping motion, and the response is to switch color between the specific user marks and the other marks.

10. A computer implemented method as recited in claim 1, wherein the other marks each represent an entity, the entity being either another user or a group of users.

11. A computer implemented method as recited in claim 10, wherein the marks are selectable via the device by the specific user.

12. A computer implemented method as recited in claim 11, wherein a first selection control on a given mark representing a given user causes the given mark to change to a visual representation of the given user.

13. A computer implemented method as recited in claim 12, wherein the first selection control is a single tap.

14. A computer implemented method as recited in claim 12, wherein a second selection control on the given mark eliminates the given mark from the audience representation layer.

15. A computer implemented method as recited in claim 14, wherein the second selection control is a double tap.

16. A computer implemented method as recited in claim 12, wherein a second selection control initiates an introduction process between the specific user and the given user.

17. A computer implemented method as recited in claim 11, wherein a first selection control on a given mark presents the specific user a set of options for engaging with a given entity represented by the given mark.

18. A computer implemented method as recited in claim 17, wherein the given entity represents a group of users, and the set of options includes a request to join the group of users.

19. A computer implemented method as recited in claim 11, wherein relative size of each mark provides an indication of a characteristic of each mark.

20. A computer implemented method as recited in claim 19, wherein relative mark size indicates active versus idle, role and/or association.

21. A computer implemented method as recited in claim 11, wherein motion of each mark corresponds to an event.

22. A computer implemented method as recited in claim 21, wherein a shaking motion indicates applause.

23. A computer implemented method as recited in claim 21, where motion of a given mark can be coupled with display changes to indicate a specific event.

24. A computer implemented method as recited in claim 21, wherein any mark could pulse in response to a corresponding entity taking a certain action.

25. A computer implemented method as recited in claim 1, wherein the other plurality of marks displayed in the audience representation layer are arranged relative to the specific user mark according to a specific algorithm.

26. A computer implemented method as recited in claim 25, wherein the specific algorithm takes into consideration social distances between the specific user and the other users.

27. A computer implemented method as recited in claim 25, wherein the specific algorithm takes into consideration geographical distance between the specific user and the other users.

28. A computer implemented method as recited in claim 25, can control a display density within the audience representation layer such that a ratio of the plurality of marks displayed divided by total audience participants can be varied.

29. A computer implemented method as recited in claim 28, wherein the device has a touch screen, and a two finger pinch gesture scales the ratio.

30. A computer implemented method as recited in claim 29, wherein the specific user can scroll or move around the audience representation layer.

31. A computer implemented method as recited in claim 1, further comprising:
    providing a social graph for the specific user; and
    for other users which are within a certain distance from the specific user within the social graph, providing an image for such users at corresponding marks.

32. A computer implemented method as recited in claim 1, further comprising:
    providing interface controls enabling the specific user to engage with the plurality of users.

33. A computer implemented method as recited in claim 32, wherein the interface controls enable initiating a group video chat.

34. A computer implemented method as recited in claim 1, wherein an interface control enables the specific user to shift a viewing angle of the audience representation layer resulting in a quasi three dimensional view.

35. A computer implemented method as recited in claim 1, further comprising:
    allowing the specific user to toggle the audience representation layer into a condensed representation.

* * * * *